June 20, 1961   W. L. GARBERDING   2,988,942
COMBINATION MOTOR MOUNT AND HYDRAULIC PRESSURE BOOSTER
Filed May 10, 1957   3 Sheets-Sheet 1
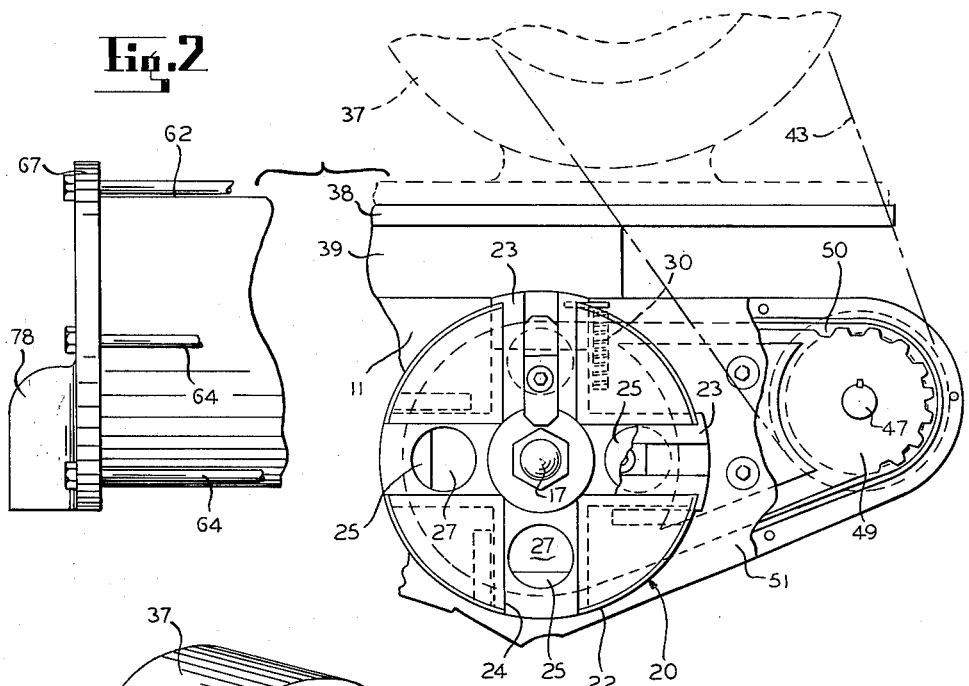
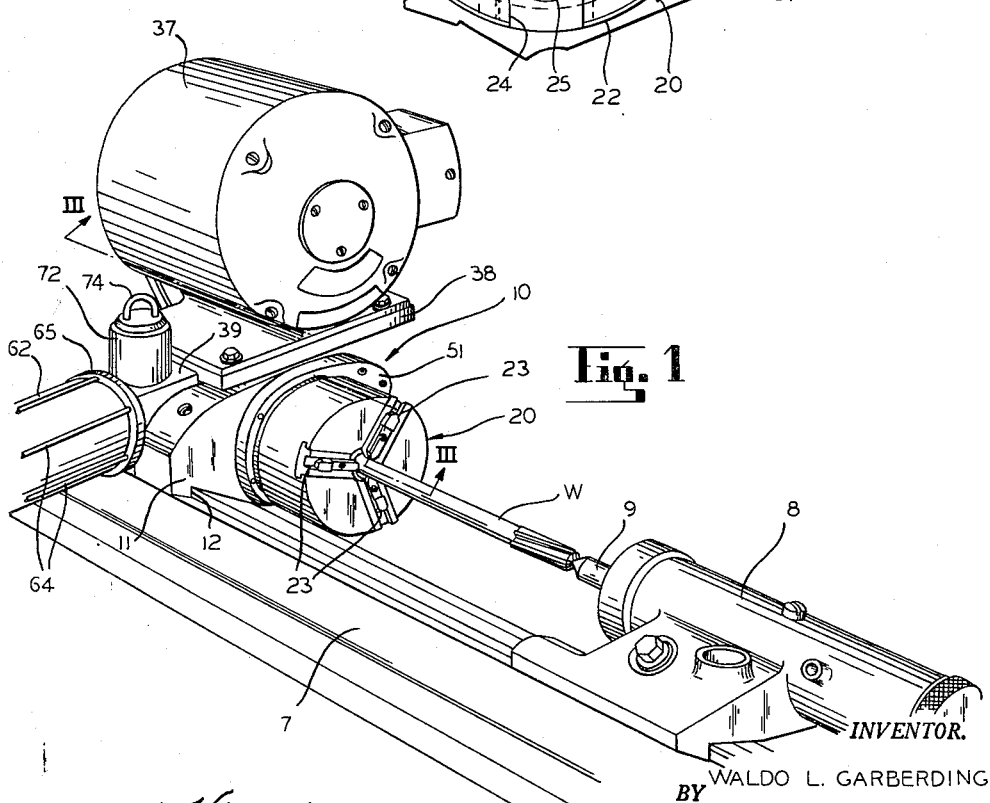
INVENTOR.
WALDO L. GARBERDING
BY
ATTORNEYS June 20, 1961 W. L. GARBERDING 2,988,942
COMBINATION MOTOR MOUNT AND HYDRAULIC PRESSURE BOOSTER
Filed May 10, 1957 3 Sheets-Sheet 2
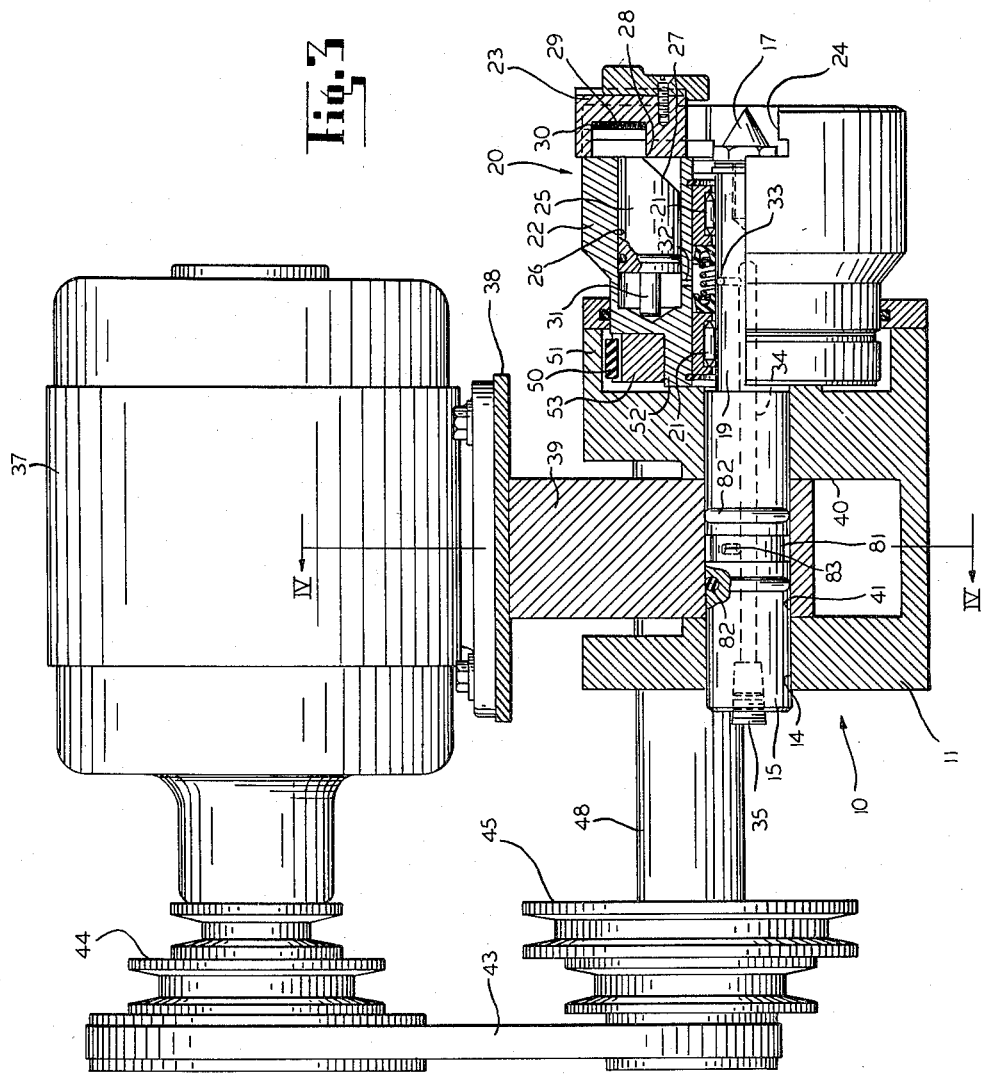
INVENTOR.
WALDO L. GARBERDING
BY
ATTORNEYS

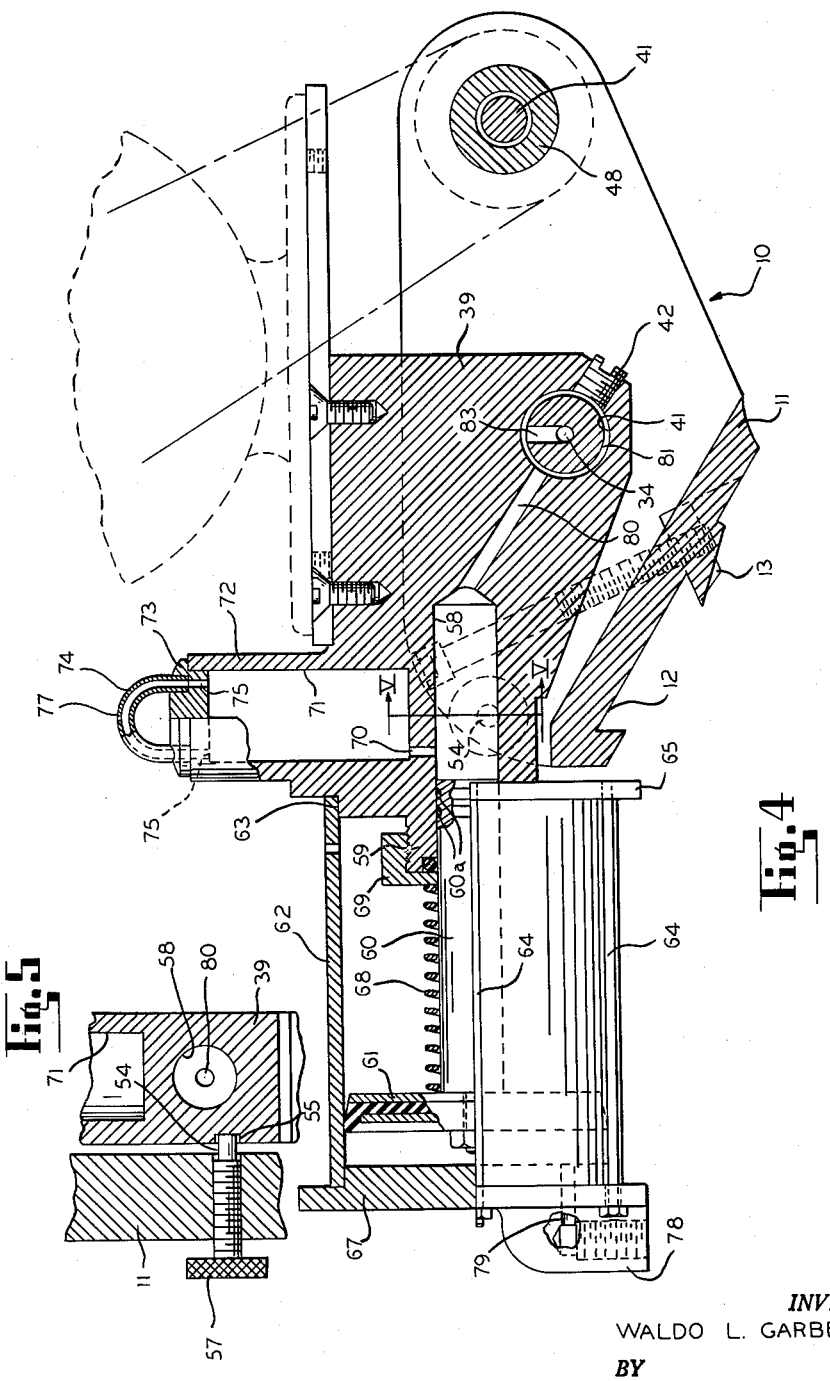

United States Patent Office 2,988,942
Patented June 20, 1961

2,988,942
COMBINATION MOTOR MOUNT AND HYDRAULIC PRESSURE BOOSTER

Waldo L. Garberding, % Twentieth Century Mfg. Co., Bradley Road and Rte. 176, Libertyville, Ill.
Filed May 10, 1957, Ser. No. 658,419
5 Claims. (Cl. 82—28)

The present invention relates to improvements in machines wherein a motor driven device includes a hydraulic system requiring a pressure booster.

In certain power tools, such as cylindrical grinders, lathes, and the like, a prime mover such as an electrical motor may be mounted pivotally on the headstock unit of the machine to facilitate quick gear ratio changes for the rotary drive for the work holding chuck.

In my copending application Serial No. 634,936, filed January 18, 1957, are described certain forms of fluid presure operated chucks in which actuating piston structure is motivated by fluid pressure to drive the chuck jaws. In especially the form of the chuck wherein individual small jaw driving pistons are motivated, rather strong pressures are needed to afford the required gripping force for the chuck jaws. Such pressures may be up to 800 to 900 p.s.i. Such pressures are much greater than are usually available in most shops where line pressures of about 100 p.s.i. are usually the maximum. Therefore, a pressure booster is needed. As heretofore available, however, such a pressure booster installation has necessitated a separate, cumbersome unit that substantially adds to the space requirements for the apparatus.

An important object of the present invention is to provide a pressure booster arrangement that is of extremely compact construction in association with a prime mover mount on the headstock unit of a machine tool.

Another object of the invention is to provide an improved combination prime mover mount and pressure booster construction.

A further object of the invention is to provide a novel hydraulic machine tool chuck construction utlizing the chuck spindle as not only the means by which the chuck is supplied with pressure fluid but also as a support for a pressure booster.

Other objects, features and advantages of the present invention will be readily apparent from the following detailed description of a preferred embodiment thereof taken in conjunction with the accompanying drawings in which:

FIGURE 1 is a fragmentary perspective view of a machine tool assembly embodying features of the invention;

FIGURE 2 is a fragmentary inner end elevational view of the headstock of the machine of FIGURE 1, with certain parts broken away to reveal details of structure;

FIGURE 3 is an enlarged vertical sectional elevational detail view taken substantially on the line III—III of FIGURE 1;

FIGURE 4 is a vertical sectional detail view taken substantially on the line IV—IV of FIGURE 3; and FIGURE 5 is a fragmentary sectional detail view taken substantially on the line V—V of FIGURE 4.

A machine tool as shown in FIGURE 1 comprises a suitably supported bed 7 adjustably supporting a tailstock 8 carrying a center 9. At the opposite end of the bed 7 is supported a headstock unit 10 comprising a combination center spindle and chuck support, prime mover support and power transmission support. To this end, the headstock includes a carriage 11 that may be in the form of a casting provided with a dovetail groove saddle portion 12 slidably engageable with the dovetail ways of the bed 7. Suitable screw actuated holding clamps 13 are provided for securing the headstock in adjusted relation to the tailstock 8.

Having reference to FIGURES 3 and 4, the headstock carriage member 11 has a horizontal bore 14 within which is slidably mounted a spindle 15 disposed on an axis coaxial with the tailstock center 9 and provided at its inner end with a removable center 17.

Supported on an inner reduced diameter end portion 19 of the spindle 15 is a rotary chuck 20 mounted on suitable roller bearings 21 riding on the reduced diameter spindle portion 19. A head or body member 22 comprises the supporting or carrying component of the chuck and is provided with an end face portion disposed about the center 17 and carrying a plurality, herein three, of radially reciprocable jaw assemblies 23 slidably rotatably mounted in radial guide grooves 24 recessed in the chuck body end face portion (FIGS. 1, 2 and 3) and which may be generally along the lines of my aforesaid copending application Serial No. 634,936, filed January 18, 1957.

Pressure fluid motivated chuck jaw actuating means are provided, herein comprising respective individual jaw actuating plunger pistons 25 reciprocable in respective blind end bores 26 that open in aligned relation into the respective guide grooves 24. Each of the pistons 25 has a cam surface 27 for transmitting axially outward motion of the piston into radially inward thrust of the associated jaw 23 by acting upon a force transmitting shoulder 28 located at the inner edge of a recess or cavity 29 in the body member of the jaw. Suitable spring means 30 normally acts to retract the jaw assemblies 23.

For driving the pistons 25, pressure fluid such as a suitable hydraulic medium is supplied into a cylinder space behind the pistons in the blind end portions of the cylinders 26. For this purpose, a spaced relationship between the inner ends of the respective pistons 25 and the blind end of the cylinder bore 26 is normally maintained by means of a spacer or stop pin extension 31 on the piston, and into the cylinders pace thus provided opens a fluid passage port 32 which communicates with a sealed off space between the inner diameter of the chuck body 22 and the reduced diameter spindle portion 19 and the bearing assemblies 21. Into such sealed off space opens a lateral duct or passage or port 33 in the spindle portion 19 leading off from an axially extending fluid passage duct or bore 34 in the spindle 15 and preferably opening through the outer end of the spindle so that if desired a source of pressure fluid may be connected to such end. In the present instance, the mouth or inlet of the passage 34 is shown as closed by a closure plug 35.

In operation, a work piece W (FIG. 1) such as a reamer to be finish ground after hardening, is mounted between the centers 9 and 17 and the chuck jaws 23 operated to grip the work piece firmly. Since each of the jaw actuating pistons 25 is individually hydraulically driven, the chuck jaws 23 are self-adjusting to compensate for any run out or eccentricity in the perimeter of the work piece with respect to its centers. It might be pointed out that for accommodating large bore or cavitated work pieces, the chuck jaws 23 can be reversed to operate for work engagement by radially outward thrust rather than, as shown, by radially inward thrust for work gripping.

Operative rotation of the chuck assembly 20 is effected by means of a prime mover such as an electric motor 37 mounted on a platform 38 carried by a supporting member 39 in the form of a vertical flat sided casting or block received within a vertical slot 40 in the carriage block 11 intersecting the spindle bore 14 so that the motor mount member 39 can be carried by the spindle 15 as best shown in FIGURES 3 and 4. For this purpose, the motor mount block 39 is provided with a horizontal bore 41 through which the spindle 15 extends, and a set screw 42 secures the support block 39 corotatively with the spindle 15 and also serves to maintain the spindle 15 in predetermined axial position within the carriage member 11.

Power is transmitted from the motor 37 to the chuck 20 by means of a transmission belt 43 trained over a selected one of a plurality of variable ratio V-pulleys 44 mounted on the motor shaft, and complementary one of a set of V-groove pulleys 45 mounted on a shaft 47 carried by a journal 48 carried by the carriage member 11. The end of the shaft 47 opposite the pulleys 45 has keyed thereto a drive pinion 49 over which is trained a chain belt 50 (FIG. 2) running within an enclosed housing 51 on the inner side of the carriage 11 and into which projects a reduced diameter butt end portion 52 of the chuck body 22 upon which is fixedly mounted a driven pulley 53 over which the chain belt 50 is also trained (FIG. 3).

In order to enable changing of the gear ratio or motor speed relative to rotary speed of the chuck 20, the transmission belt 43 may be selectively trained over selective complementary ones of the pulleys 44 and 45, and to accomplish this conveniently, the motor mount is adapted to be rocked about the axis of the shaft or spindle 15 to slacken off or tighten the drive belt 43. In the drive belt tightened relationship, the motor mount member 39 is held fixedly by suitable means such as a retaining pin 54 (FIGS. 4 and 5) threadedly extending through the outer vertical wall portion of the carriage member 11 and retainingly engageable endwise in a socket 55 provided for this purpose in the opposing face of the motor mount block member 39. A readily accessible knurled periphery hand wheel or knob 57 on the outer end of the retaining pin member 54 is readily manipulable to back the pin out of retaining engagement when it is desired to effect a transmission belt change, and to run the retaining pin 54 back into engagement within the socket 55 after the change has been effected.

According to the present invention, the motor mount block member 39 serves also as a pressure booster device to provide hydraulic pressures for operating the hydraulic chuck jaw actuating system of greatly multiplied magnitude, compared to pressure fluid line pressures that may be available in the shop using the machine. For example, where the maximum line pressure of a compressed air system is about 100 p.s.i., but jaw gripping pressures of 800 to 900 p.s.i. are required, the pressure booster is a desirable adjunct. To this end, the motor mount block 39 is provided with a small diameter pressure booster cylinder bore 58 (FIG. 4) which opens from the side of the support member 39 opposite the journal structure 48 through a boss 59 and has reciprocably operable therein a small diameter pressure multiplying piston 60 the inner end portion of which is slidably engaged within the pressure booster cylinder bore 58 and has annular pressure seal means 60a in its periphery engaging the cylinder wall. At its outer end, the piston 60 carries a large diameter piston assembly 61 of the U-packing or cup type sealingly engaging the internal cylindrical wall of a cylinder 62 maintained concentric with the boss 59 by a recess annular shoulder 63 on the support member 39 and replaceably secured in place by means of tie rods 64 secured in a suitable collar flange 65 on the support member 39 and engaging at their outer end portions with a closure flange member 67 on the cylinder 62.

Normally the booster plunger piston 60 is maintained in a retracted position by means such as a coiled compression spring 68 thereabout and thrusting at its opposite ends respectively against the back of the piston assembly 61 and a packing gland flange 69 on the outer end of the boss 59. In this relationship, the large piston 61 is disposed adjacent to the closure flange 67 while the inner end portion of the piston plunger 60 is located in the outer end portion of the cylinder bore 58 clear of a replenishing and pressure unlocking small metering orifice 70 opening into the booster cylinder 58 from and providing communication with a replenishing reservoir 71 located in gravity feed relation thereto in the upper portion of the supporting block member 39 and in part at least defined within an upstanding reservoir boss 72 thereon. At its top the reservoir 71 opens from the boss 72 but is normally closed by a closure cap 73 having thereon a safety breather pipe member 74 in the form of a loop with its ends secured into the cap. At least one end of the tubular loop or pipe member 74 communicates with the interior of the reservoir 71 through a communication port 75 in the inner portion of the cap. In its crown, the breather, safety pipe member 74 has a small breather port 77. Through this arrangement the pipe loop member 74 serves primarily as a breather orifice or port device which is substantially protectively related to the reservoir 71 to avoid entrance of foreign matter thereinto as a result of breathing through the breather passage and secondarily as a surge leakage preventing means since should hydraulic fluid such as oil be entrained in air forceably propelled out through the breather orifice 75, or either of them where each end of the pipe is supplied in such an orifice, the baffling effect of the curved path the air and entrained oil must take through the loop of the tube member 74 causes the oil to drop out and be caught on the walls defining the tube passage and then drain back into the reservoir. In addition, the tubular loop member 74 serves also as a handle by which the closure cap 73 can be readily manipulated when it is desired to gain access into the reservoir 71 for refilling or other purposes.

With the pressure booster system shown herein, having about the size differential or pressure surface ratio shown, a boost in pressure of about 12 to 1 can be attained. This may, of course, be varied as preferred by appropriate variation in the relative pressure surface areas of the booster piston 60 and the line pressure responsive piston 61. Thus, when line pressure is introduced into the space between the closure cap 67 and the piston 61 from a suitable source through a hollow inlet boss 78 on the outer side of the cap 67 and an inlet passage 79 leading therefrom to the inner side of the cap 67, the piston 61 is driven in opposition to the bias of the spring 68 and thereby drives the booster piston 60 into the inner portion of the booster cylinder 58 past the reservoir port 70 and from thereon in a hydraulic pressure boosting stroke. Under booster piston impulse, the hydraulic fluid passes from the inner end of the booster cylinder 58 through a delivery duct or passage 80 drilled in the supporting member 39 into the transverse bore 41 to discharge into a registering annular peripheral groove 81 in the spindle 15 sealed against axial escape of pressure fluid along the spindle by suitable sealing rings 82 recessed into the periphery of the spindle at respectively opposite sides of the groove 81 and sealingly engaging the wall of the bore 41. From the groove 81 the pressure fluid passes by way of a communicating transverse port 83 into the spindle passage 34. Thence, of course, the pressure fluid is distributed to the chuck jaw operating piston cylinders in the manner hereinbefore described. By virtue of the continuous pressure fluid connection maintained between the delivery port 33 in the spindle portion 19 and the continuous encompassing chamber thereabout with which the respective cylinder communication ports 32 communicate jaw gripping pressure is maintained continuously even though the jaw 20 may be rotating at high speed in operation.

Promptly upon discontinuance or release of line pressure upon the driving piston 61, action of the return spring 68 withdraws the booster piston 60 until it again clears the pressure relief, air bleed or purging and fluid replenishing port 70. Hydraulic pressure thus drops to zero in the chuck jaw operating pressure fluid system and the chuck jaws 23 back off from the work piece. Any hydraulic fluid that may leak from the system is replaced from the reservoir 71 through the replenishing orifice 70 and the system is thus a continuously filled system requiring actually only a small or short booster piston stroke from full pressure to zero pressure at opposite sides of the relief-replenishing orifice 70. By providing a substantial operative length in the booster cylinder 58 inwardly beyond the orifice 70, operation of the hydraulic system can continue for a substantial period even after the hydraulic fluid in reserve in the reservoir 71 may be depleted, unless there is some unusual leakage somewhere in the system.

It will be understood that modifications and variations may be effected without departing from the scope of the novel concepts of the present invention.

I claim as my invention:

1. In a machine tool construction, a supporting structure, a spindle carried rockably by said supporting structure, a chuck assembly carried rotatably by the spindle and having reciprocable work gripping jaws with hydraulically actuated means for operating the jaws and a pressure fluid system including fluid passage means in said spindle, a pressure booster carried by said spindle and communicating with the pressure passage means thereof for multiplying the chuck jaw motivating pressure fluid responsive to a predetermined line fluid pressure of smaller magnitude impressed thereon, said booster including a body structure fixedly mounted on the spindle and having in addition means thereon for supporting a prime mover for providing motive power to drive the chuck rotatably relative to the spindle, and releasable means for retaining said body structure and thereby said spindle in a predetermined fixed relation to the supporting structure but releasable to enable rocking of the spindle and corresponding rocking of said body and the prime mover for setting up or adjustment.

2. In combination in a machine tool assembly, a head stock body for supporting a spindle having thereon a rotary chuck equipped with hydraulically actuated chuck jaws and having a hydraulic actuating system including fluid passage through the spindle, a combination motor mount and pressure booster member carried by the spindle and having a pressure booster system for communicating with the spindle passage, a motor mounted on said member and having driving connection with means carried by the head stock body spaced from said spindle for transmission of motive power from the motor to rotate the chuck, and means for maintaining said member in fixed position relative to said body and said spindle non-rotatable relative to said body.

3. In a machine tool construction, a head stock comprising a member having a spindle bore therethrough intersected by a slot of substantial depth, a spindle mounted in said bore, and across said slot, and having a chuck mounted on one end portion thereof, a prime mover mount carried by the portion of the spindle traversing said slot, power transmission means carried by said head stock spaced from said spindle for rotatably driving said chuck and adapted to be driven by a prime mover carried by said prime mover support, and means for adjustably securing said prime mover support in a rockably disposed position about the axis of said spindle.

4. In a machine tool construction, a head stock comprising a member having a spindle bore therethrough intersected by a slot of substantial depth, a spindle mounted in said bore, and across said slot, and having a chuck mounted on one end portion thereof, a prime mover mount carried by the portion of the spindle traversing said slot, power transmission means carried by said head stock spaced from said spindle for rotatably driving said chuck and adapted to be driven by a prime mover carried by said prime mover support, and means for adjustably securing said prime mover support in a rockably disposed position about the axis of said spindle, said prime mover support having a pressure booster extension thereon carrying a pressure booster device communicating hydraulically with hydraulic chuck jaw actuating means of the check through said prime mover support and said spindle.

5. In a machine tool assembly, a head stock including a body member providing a generally bifurcated construction with a pair of upstanding spaced supporting arm portions having coaxial bores therethrough, a spindle slidably extending through said bores across the gap between said arms and having one end portion thereof at the side of one of said arms opposite to said gap a rotatably mounted chuck including shiftable chuck jaws and hydraulically actuated means for shifting the jaws from retracted to work-gripping position, hydraulic fluid passage means provided in said chuck and said spindle for motivating said jaw actuating means, a combination motor mount and pressure booster including a motor mount block having a spindle bore therethrough and thereby engaging said spindle between said arms, means securing said block fixedly to the spindle whereby to hold the spindle against axial displacement and to enable rocking of the block utilizing the spindle as trunnions therefor, a motor mounted on said block, means spaced from the spindle for effecting a power transmission between the motor and the chuck for rotatably driving the chuck and including an operatively tensionable endless transmission device relaxable and tensionable by rocking of the block with the spindle, means carried by one of said arms releasably holding the block in a predetermined operating position wherein said endless device is actively tensioned, and pressure booster means carried by said block and including means for impression of pneumatic line pressure for motivating a pressure multiplying structure active to pressurize a hydraulic fluid supply included within a chamber in said block having passaged communication with a ported passage in said spindle in the area of the spindle engaged by said block and thereby active to motivate the jaw actuating means of the chuck.

References Cited in the file of this patent

UNITED STATES PATENTS

| | | |
|---|---|---|
| 1,812,816 | Weaver | June 30, 1931 |
| 1,815,562 | Godfriaux | July 21, 1931 |
| 2,162,797 | Boldt | June 20, 1939 |
| 2,290,537 | Christensen | July 21, 1942 |
| 2,564,137 | Wahlberg | Aug. 14, 1951 |
| 2,612,071 | Kurzweil | Sept. 30, 1952 |
| 2,627,197 | Le Tourneau | Feb. 3, 1953 |
| 2,655,383 | Di Palo | Oct. 13, 1953 |
| 2,662,708 | Schmitt | Dec. 15, 1953 |
| 2,713,283 | Lomazzo | July 19, 1955 |

FOREIGN PATENTS

| | | |
|---|---|---|
| M24,367 IB/49a | Germany | Jan. 19, 1956 |

OTHER REFERENCES

Publication: Brochure UNIMAT for Home and Industry, American Edelstool, Inc., Unimat Division, 350 Broadway, New York 13, N.Y.